United States Patent
Haake et al.

(10) Patent No.: US 9,205,500 B2
(45) Date of Patent: Dec. 8, 2015

(54) METHOD FOR CODING A LOCK AND A BLANK FOR SAME

(71) Applicants: Andre Haake, Stadtlohn (DE); Oliver Haake, Stadtlohn (DE); Patrick Haake, Vreden (DE)

(72) Inventors: Andre Haake, Stadtlohn (DE); Oliver Haake, Stadtlohn (DE); Patrick Haake, Vreden (DE)

( * ) Notice: Subject to any disclaimer, the term of this patent is extended or adjusted under 35 U.S.C. 154(b) by 38 days.

(21) Appl. No.: 13/765,170

(22) Filed: Feb. 12, 2013

(65) Prior Publication Data
US 2013/0152352 A1 Jun. 20, 2013

Related U.S. Application Data

(63) Continuation of application No. PCT/DE2011/075235, filed on Sep. 27, 2011.

(30) Foreign Application Priority Data

Oct. 11, 2010 (DE) .......................... 10 2010 038 105

(51) Int. Cl.
*E05B 11/00* (2006.01)
*E05B 19/00* (2006.01)
(Continued)

(52) U.S. Cl.
CPC ............... *B23D 13/00* (2013.01); *B23P 15/005* (2013.01); *E05B 17/0004* (2013.01); *E05B 19/00* (2013.01); *E05B 35/008* (2013.01); *Y10T 29/442* (2015.01)

(58) Field of Classification Search
CPC ......... E05B 19/00; E05B 19/12; E05B 19/08; E05B 19/14; E05B 19/02; E05B 19/0035; E05B 15/1635; E05B 19/0041; E05B 35/033; B23D 67/00; B23D 69/02; B23P 17/00; B23P 13/04; B23P 15/005; B23C 3/35
USPC .......... 29/76.2, 412, 414, 415, 416, 417, 557, 29/425; 70/393, 395, 398, 400, 401, 402, 70/389, 409
See application file for complete search history.

(56) References Cited

U.S. PATENT DOCUMENTS 1,573,791 A * 2/1926 Roethlisberger ................ 70/395
2,591,652 A * 4/1952 Ziegliss .......................... 70/395
(Continued)

FOREIGN PATENT DOCUMENTS

| DE | 671543 C | 2/1939 |
| EP | 1602792 A1 | 12/2005 |
| FR | 2798690 A1 | 3/2001 |

OTHER PUBLICATIONS

Exhibit A: print-out of a definition of "Schlüsseltransfersystem", http://www.dict.cc/german-english/Schlüsseltransfersystem.html, Jan. 19, 2015. Previously submitted with Reply of Jan. 20, 2015.
(Continued)

*Primary Examiner* — Essama Omgba
*Assistant Examiner* — Darrell C Ford
(74) *Attorney, Agent, or Firm* — Patricia Mathers

(57) ABSTRACT

A method for coding a key and a female lock part for a lock in a lock system, whereby a blank is separated into two parts by a separating cut that is guided perpendicular to the longitudinal axis and in the direction of the longitudinal axis of the blank. The cut forms a coding contour. The two parts are then post-processed to form the key and the female lock part or serve as coding disks that are affixed to a key and a female lock part.

12 Claims, 4 Drawing Sheets

(51) Int. Cl.

| | |
|---|---|
| *E05B 19/02* | (2006.01) |
| *E05B 19/06* | (2006.01) |
| *E05B 19/08* | (2006.01) |
| *E05B 19/12* | (2006.01) |
| *B23P 17/00* | (2006.01) |
| *B23D 13/00* | (2006.01) |
| *B23P 15/00* | (2006.01) |
| *E05B 17/00* | (2006.01) |
| *E05B 35/00* | (2006.01) |

(56) References Cited

U.S. PATENT DOCUMENTS

| | | | | |
|---|---|---|---|---|
| 3,276,233 | A * | 10/1966 | Russell et al. | 70/382 |
| 3,338,078 | A * | 8/1967 | Eberitch et al. | 70/428 |
| 3,729,964 | A * | 5/1973 | Hsu | 70/338 |
| 3,841,120 | A * | 10/1974 | Gartner | 70/395 |
| 4,109,496 | A * | 8/1978 | Allemann et al. | 70/380 |
| 4,120,184 | A * | 10/1978 | Gerlach | 70/389 |
| 4,313,601 | A * | 2/1982 | Graef et al. | 271/207 |
| 4,337,987 | A * | 7/1982 | Brooks et al. | 312/219 |
| 4,402,201 | A * | 9/1983 | Nokes | 70/395 |
| 4,599,877 | A * | 7/1986 | Rabinow | 70/366 |
| 4,875,352 | A * | 10/1989 | Smallegan et al. | 70/395 |
| 5,079,935 | A * | 1/1992 | Zaucha | 70/140 |
| 5,289,709 | A | 3/1994 | Field | |
| 5,372,024 | A * | 12/1994 | Ruckert | 70/406 |
| 5,419,168 | A * | 5/1995 | Field | 70/494 |
| 5,964,112 | A * | 10/1999 | Stefanescu | 70/493 |
| 6,604,308 | B1 * | 8/2003 | Robles | 40/330 |
| 7,337,639 | B2 * | 3/2008 | Edwards, Jr. | 70/409 |
| 8,413,473 | B2 * | 4/2013 | Tamezane et al. | 70/352 |
| 8,485,006 | B2 * | 7/2013 | Kiiski | 70/366 |
| 8,646,298 | B2 * | 2/2014 | Lessels | 70/383 |
| 8,794,043 | B2 * | 8/2014 | Ben-Aharon et al. | 70/405 |
| 9,073,133 | B1 * | 7/2015 | Mueller et al. | 1/1 |
| 2003/0140669 | A1 * | 7/2003 | Bailey et al. | 70/389 |
| 2006/0090528 | A1 * | 5/2006 | Moening | 70/395 |
| 2008/0134735 | A1 * | 6/2008 | Gallo et al. | 70/263 |
| 2010/0313618 | A1 * | 12/2010 | Nirmel | 70/391 |
| 2012/0147550 | A1 * | 6/2012 | Takata et al. | 361/679.43 |
| 2014/0352374 | A1 * | 12/2014 | Shen | 70/357 |
| 2014/0352375 | A1 * | 12/2014 | Hertel et al. | 70/492 |
| 2015/0013404 | A1 * | 1/2015 | Valente et al. | 70/344 |
| 2015/0061831 | A1 * | 3/2015 | Sankey et al. | 340/5.65 |

OTHER PUBLICATIONS

Exhibit B: Print-out of Wikipedia article on Trapped Key Interlocking, http://en.wikipedia.org/wiki/Trapped_key_interlocking, Jan 19, 2015. Previously submitted with Reply of Jan. 20, 2015.

Exhibit C: Screen shot from Haake Technik GmbH website, www.haake-technik.com, German-language page, Jul. 2015.

Exhibit D: Screen shot from Haake Technik GmbH website, www.haake-technik.com, English-language page, Jul. 2015.

Exhibit F: Photographs of a 3D-printed prototype of a trapped-key interlocking system developed by Haake Technik GmbH, Jul. 2015.

* cited by examiner

METHOD FOR CODING A LOCK AND A BLANK FOR SAME

BACKGROUND INFORMATION

1. Field of the Invention

The invention relates to the field of locks with keys. More particularly, the invention relates to a method of coding a key and a female lock part.

2. Discussion of the Prior Art

In a trapped key interlocking system, the lock stamp or female lock part is built into the lock of the trapped key interlocking system and is therefore an integral component of the system, whereby a key is needed to open the lock and thereby the female lock part. The individual locks are provided with a unique coding between the female lock part and the key, so that it is only possible to operate the lock with a key having the matching code. Normally, the key meshes into the female lock part of the lock and thus creates a form-fitting unit. The female lock part itself works, for example, together with a blocking arrangement of the tumbler, or via an integrated square edge or something similar, for example, with an electrical switch.

An example of the prior art is shown in FIG. 1. The coding comprises a combination of pins and boreholes. The key has a number of boreholes in a given arrangement, and the lock stamp is provided with an identical number of pins in the same arrangement as that of the key, which, when the codes match, can mesh into the boreholes of the key. The key can then be inserted far enough into the lock to operate the lock. It is not possible to operate the lock, if the hole and pin patterns do not match.

The prior art also teaches that, instead of pins and boreholes, milled letters or combinations of letters can be provided as key coding. Milled or cast contours are also used.

Characteristic for the prior art and the conventional codings is that the codings must be manufactured separately for the keys and the lock stamps. This means that the key is coded, for example, by machining the bores, and that the female lock part is made to match the key, by machining the bores and pressing in the pins.

It is obvious that the manufacturing these known codings is costly and that the number of codings is limited.

BRIEF SUMMARY OF THE INVENTION

It is an object of the invention to propose a method for manufacturing the coding in one production step and in both components at the same time, namely, in the key and in the lock stamp or female lock part or in each of two coding disks that are then affixed as coding faces to the key or the female lock part.

To achieve this object, it is recommended that a bolt-like blank, for example, be separated into two parts by a separating cut that is guided perpendicular and also parallel to the longitudinal axis of the blank, wherein the two parts are then post-processed to create the key and the female lock part, or are affixed as coding disks to a key and an female lock part. The separation plane between the two parts of the blank, which is created by the separating cut or the separating method, automatically forms the coding. The separation cut may be guided in such a way that that an angular or a wavy separation plane is created. In like manner, it is possible to provide a parallel or radial separating cut. Variations in the detail, the contour, the alignment of the contour, and the radial alignment of the contour to the longitudinal axis of the blank allow the maximum possible number of codings.

The coding disks thus created are connected to the actual key and the lock stamp, and the thus created and coded female lock part is built into the lock.

Instead of providing the coding directly on the components that are the key and the female lock part, it is also possible to separate a component into two parts, using the separation cut according to the invention that creates the matching coding on both parts, and then using the two parts as coding disks, one disk of which is then affixed to the key part, and the other to the female lock part.

If the coding is provided on the key and the female lock part, the coding of must be accomplished before the lock device is assembled. Because the coding has to be unique, this means that the coding can only be done per order. This makes the production of the lock very time-consuming.

It is possible, however, using the method according to the invention, to provide two coding disks that are then connected or affixed to the key and the female lock part. This makes it possible to provide the coding disks as the last step in the lock production process. It is now possible to manufacture and prefabricate the components of the lock, i.e., the key, the locking mechanism, the tumbler, the lock, and the like, and, separately, to manufacture coding disks. When an order is placed, the coding disk are then affixed to the key and the female lock part.

There are many suitable ways of connecting or affixing the coding disks to the key and to the female lock part, such as, for example, a positive form fit, material-joined, and interference fit. A crimp connection, a rivet connection, a screw connection, or a method using clips may be used. Means, such as safety latches or the like may also be used.

According to the invention, a key bolt with a key bit that extends through the female lock part may be inserted in the key, so that, in its operating state, e.g., when it is turned in the female lock part or in the lock, the key is prevented from being removed axially.

The blank may be made of metal or plastic and, for example, may be a precision-cast component or made of cylindrical or polygonal bar stock.

A laser separating method or a water-jet separating method are options for the separating method, although the invention is in no way limited in this regard.

In summary, the method according to the invention allows the key and female lock part, or a blank that is inserted between the key and the female lock part, to be coded in one production step on one initial component. Tolerances no longer have to be considered because the two coded parts always match, because they have been produced by the same separation cut.

The method according to the invention makes a very high number of codings possible, and the codings form parts that are created of a single material. This largely eliminates corrosion problems between the parts.

It is possible to create the lock codings, even with materials that are mechanically difficult to machine, and based on the selected separation method, to significantly reduce manufacturing costs.

Finally, it should be mentioned that, with the method according to the invention, neither scraps nor waste accrue.

BRIEF DESCRIPTION OF THE DRAWINGS

An embodiment of the invention is described below using the drawings.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

Figure 1:
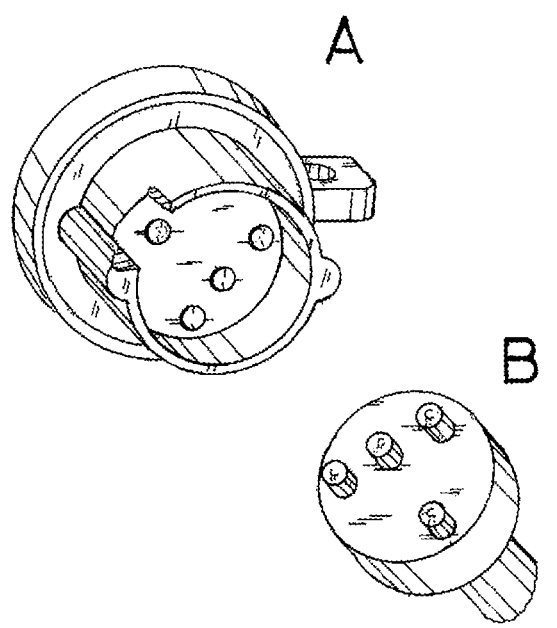
FIG. 1 illustrates the prior art, a blank.

FIG. 1 illustrates the prior art, a key A and a lock stamp B for use in a trapped key interlocking system, whereby the key A is provided with boreholes into which the pins that are arranged on the top of the lock stamp or key plug B can mesh. The coding is created the specific arrangement of the pins and the boreholes. It is obvious that both parts require a significant amount of machining for this type of coding: bores have to be machined in the key and the pins that fit into the bores have to be machined on the plug. The disadvantages of machining are known. For example, tolerances have to be maintained and that may be complicated by the fact that various materials may possibly be used, particularly for the pins that are provided in key plug B. Furthermore, machining is costly.

Figure 2:
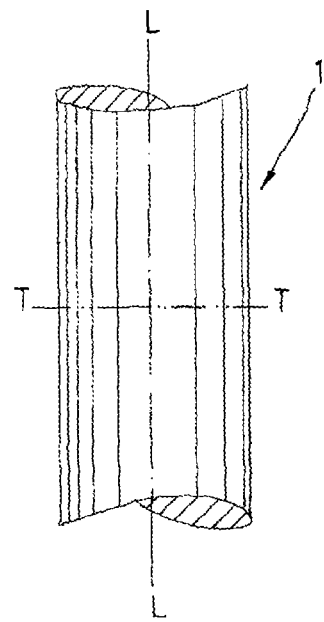
FIG. 2 illustrates the two individual parts manufactured from the blank by means of a separating method.
Figure 3A:
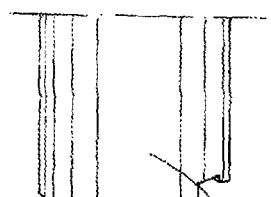
FIG. 3A illustrates a key with one type of coding.
Figure 3B:
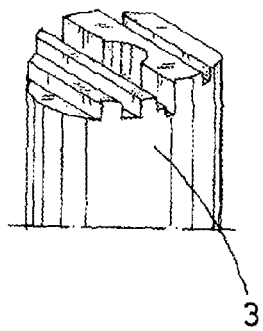
FIG. 3B illustrates a female lock part with mating coding for key in FIG. 3A.
Figure 4A:
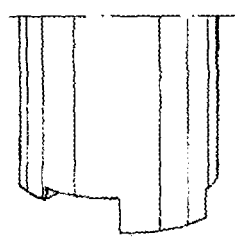
FIG. 4A illustrates a key with a pie-shaped coding.
Figure 4C:
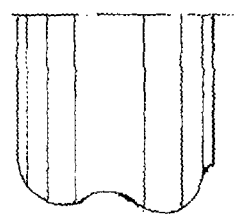
FIG. 4C illustrates a key with a continuously curved coding.
Figure 4B:
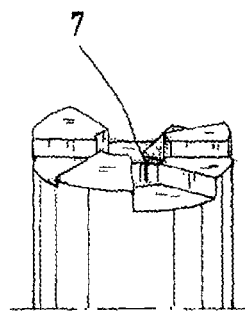
FIG. 4B illustrates a female lock part with pie-shaped coding.
Figure 4D:
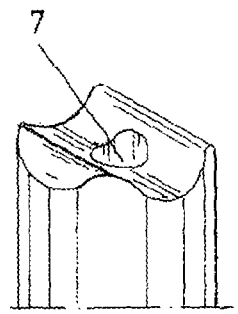
FIG. 4D illustrates a female lock part with continuously curved coding.

FIG. 2 shows a blank 1 that is a cylindrical bolt and that serves as the basis for the manufacturing of a lock stamp or female lock part 3 and a key 2 for use in a trapped key interlocking system. FIGS. 3A and 3B show the blank 1 divided into two parts 1A and 1B, the two parts having a separation boundary T-T that forms the key 2 and the lock stamp 3, respectively, on the two parts. The separation boundary T itself constitutes the coding and there are multiple ways of creating the coding. For example, as shown in FIGS. 3B and 4B, the separation process is carried out such that the separation boundary T-T is angular with planes that extend in directions both transverse and parallel to a longitudinal axis L-L of the blank 1, so as to form a straight-edged and flat-planed array of coding elements. FIG. 3B illustrates such a separation. FIGS. 4A and 4B illustrate a separation boundary that creates coding elements that are variously raised segments, similar in shape to slices of a pie. FIGS. 4C and 4D illustrate coding elements that have a rounded or undulating contour. The center axis of the workpiece for creating all of these separation boundaries T-T must be focused, i.e., clearly defined, and the lock stamp 3 provided with a central borehole 7 as a runout.

Figure 5:
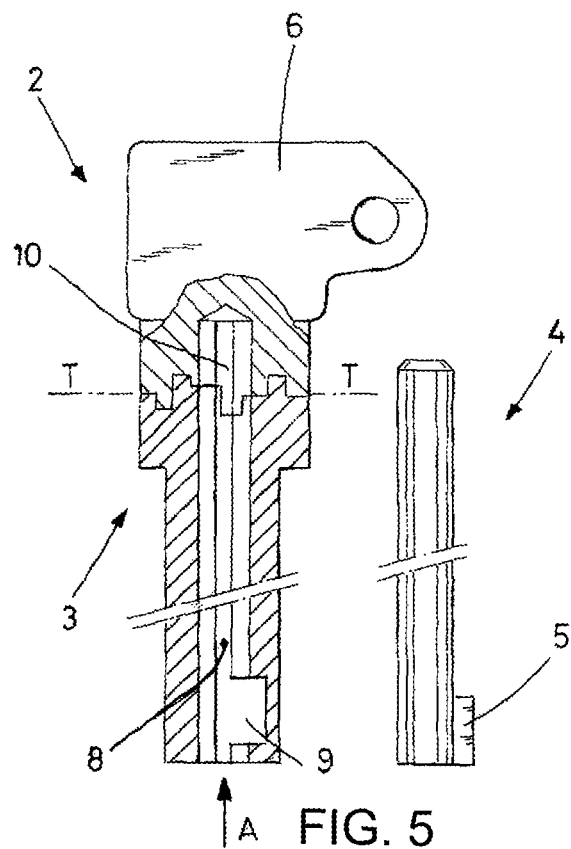
FIG. 5 illustrates a key and a female lock part manufactured according to the invention.

As shown, the separation boundary T-T may have angular or rounded contours, whereby the angular contours are very well suited not only for providing the coding, but also for transmitting the torque between the key and the female lock part. The rounded contours are advantageous in that they are less prone to becoming dirty and pose a lower risk of injury, have, however, the disadvantage that they require an additional functional element for transmitting torque from the key 2 to the lock stamp 3. FIG. 5 illustrates a key bolt 4 with a key bit 5 that is suitable for transmitting torque.

Figure 6:
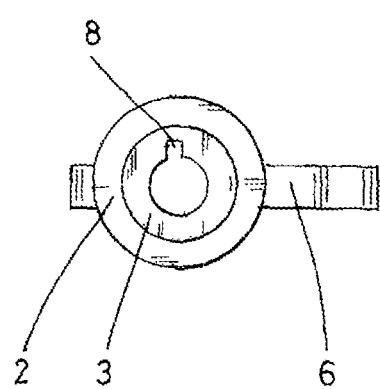
FIG. 6 is a plan view of the arrangement according to FIG. 5 (in the direction of arrow A).

FIGS. 5 and 6 illustrate a ready-to-use component that comprises a key bow or grip 6 that is made of the same material as the key 2 or is firmly affixed to the key 2. The separation boundary T-T between the key 2 and the female lock part 3 is constructed according to one of the previously described methods with the coding. The key bolt 4 with key bit 5 is inserted into the key 2, into a borehole 10 that opens at a lower end of the female lock part 3. The key bit 5 engages in a corresponding key slot 8 of the lock stamp 3, thereby creating a highly rotationally rigid connector for transmitting torque between the key 2 and the female lock part 3. Turning the bit 5 also locks it into a key recess 9, so that the key bolt 4 is secured in place.

Figure 7:
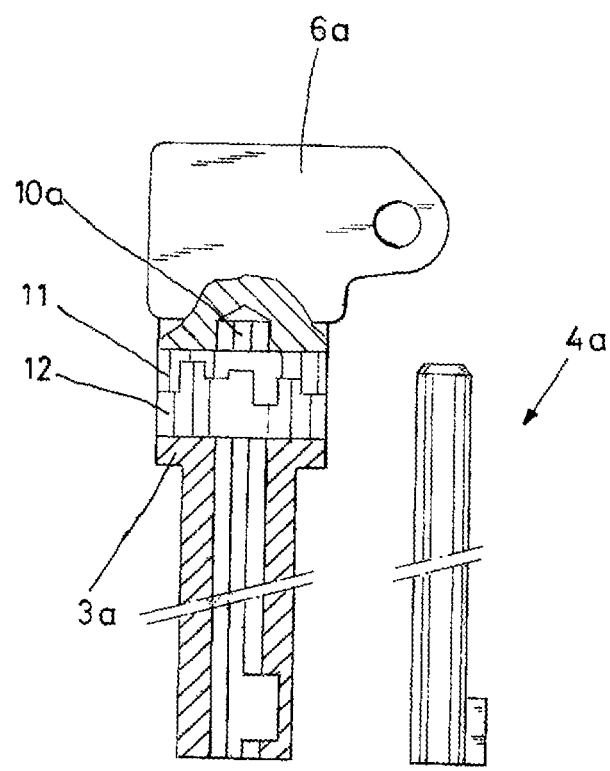
FIG. 7 illustrates the use of coding disks.

FIG. 7 illustrates one possible embodiment with coding disks 11 and 12, which are affixed to the key 2 and the female lock part 3, respectively, by conventional means, for example, by means of clips, a crimp connection, a rivet connection, a threaded connection, or locking rings, etc. FIG. 7 shows the actual key, designated with number 6a, the coding disk 11 assigned to this key 6a, and the female lock part 3a with its associated coding disk 12. The female lock part 3a, the coding disks 11 and 12, and the actual key 6a have a through borehole 10a into which, as previously described, a key bolt 4a is insertable.

This embodiment with coding disks 11 and 12 has the advantage of making it now possible to pre-fabricate the components that form the locking mechanism, namely, the key 2, the lock device, the tumbler, the lock elements, or the switch device, and then to fabricate the coding disks 11 and 12, which then must be connected to the other components, only when an order is placed. Thus, upon receiving an order for a lock, only the coding has to be created, whereas the other components are prefabricated.

It is understood that the embodiments described herein are merely illustrative of the present invention. Variations in the method of coding the lock may be contemplated by one skilled in the art without limiting the intended scope of the invention herein disclosed.

What is claimed:

1. A method for coding a key and a female lock part for use in a trapped key interlocking system, the trapped key interlocking system including a lock comprising a female lock part, a locking mechanism, and a lock tumbler, the lock being configured to receive the key, the method comprising the steps of:
   a) prefabricating the key, the female lock part, the locking mechanism, and the lock tumbler, wherein the prefabricated key and the prefabricated female lock part are initially without coding;
   b) separating a blank having a longitudinal axis into a first part and a second part by means of a machined separation cut that provides a first separation boundary that serves as a first coding element on the first part and a secondary separation boundary that serves as a second coding element on the second part; and
   c) incorporating the first part onto the key and the second part into the female lock part;
      wherein, only when the key is inserted into the lock and the first coding element on the key mates with the second coding element on the female lock part is the key sufficiently insertable into the lock to engage the locking mechanism.

2. The method of claim 1 wherein the separation cut extends perpendicular and transverse to the longitudinal axis, forming angular contours on the first and second separation boundaries.

3. The method of claim 1, wherein the step of incorporating the first part into the key and the second part into the female lock part includes affixing the first part onto the key to provide the key with the first coding element and affixing the second part onto the female lock part to provide the lock with the second coding element.

4. The method of claim 1, wherein the blank is constructed as a bolt.

5. The method of claim 1, wherein the key includes a key bolt with a key bit that extends through the female lock part that is insertable into the key or the female lock part.

6. The method of claim 1, wherein a laser separation process is used as the separation process.

7. The method of claim 1, wherein a water-jet separation process is used as the separation process.

8. The method of claim 1, wherein the blank is made of metal.

9. The method of claim 1, wherein the blank is made of plastic.

10. The method of claim 1, wherein the blank is a precision-cast component.

11. The method of claim 1, wherein the blank is made from bar stock.

12. The method of claim 1, wherein the first coding element is a first coding disk that is affixable to the key and the second coding element is a second coding disk that is affixable to the female lock part.

* * * * *